United States Patent
Matsuoka et al.

(10) Patent No.: US 7,860,963 B2
(45) Date of Patent: Dec. 28, 2010

(54) SERVICE COMMUNICATION CONTROL METHOD, SERVICE RELAYING APPARATUS, MANAGEMENT SERVER, PORTAL SERVER, AND SERVICE COMMUNICATION CONTROL SYSTEM

(75) Inventors: Naoki Matsuoka, Kawasaki (JP); Haruyuki Takeyoshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 694 days.

(21) Appl. No.: 11/698,857

(22) Filed: Jan. 29, 2007

(65) Prior Publication Data

US 2008/0069122 A1 Mar. 20, 2008

(30) Foreign Application Priority Data

Sep. 15, 2006 (JP) .............................. 2006-251732

(51) Int. Cl.
G06F 15/173 (2006.01)
(52) U.S. Cl. ...................................... 709/223
(58) Field of Classification Search ......... 709/203–207, 709/217–226, 230, 238
See application file for complete search history.

(56) References Cited

U.S. PATENT DOCUMENTS

| | | | |
|---|---|---|---|
| 6,615,258 B1 | 9/2003 | Barry et al. | |
| 7,489,924 B2 * | 2/2009 | Choi | 455/420 |
| 2001/0054157 A1 * | 12/2001 | Fukumoto | 713/201 |
| 2003/0041141 A1 * | 2/2003 | Abdelaziz et al. | 709/223 |
| 2003/0074401 A1 * | 4/2003 | Connell et al. | 709/203 |
| 2003/0171113 A1 * | 9/2003 | Choi | 455/420 |
| 2004/0088170 A1 * | 5/2004 | Nakanishi et al. | 705/1 |
| 2004/0088183 A1 * | 5/2004 | Nakanishi et al. | 705/1 |
| 2004/0098344 A1 * | 5/2004 | Nakanishi et al. | 705/52 |
| 2005/0148351 A1 * | 7/2005 | Reding et al. | 455/466 |
| 2006/0056317 A1 | 3/2006 | Manning et al. | |
| 2006/0069714 A1 * | 3/2006 | Blount et al. | 709/203 |
| 2008/0155029 A1 * | 6/2008 | Helbling et al. | 709/206 |
| 2009/0172091 A1 * | 7/2009 | Hamel | 709/203 |
| 2010/0115565 A1 * | 5/2010 | Fujihira et al. | 725/91 |

FOREIGN PATENT DOCUMENTS

| | | |
|---|---|---|
| JP | 08-313758 | 11/1996 |
| JP | 2000-028979 | 1/2000 |
| JP | 2004-341583 | 12/2004 |
| JP | 2004-178271 | 6/2005 |
| JP | 2005-142702 | 6/2005 |

(Continued)

OTHER PUBLICATIONS

Japanese Office Action for corresponding Japanese application 2006-251732; mailed Oct. 7, 2008.

(Continued)

Primary Examiner—Ario Etienne
Assistant Examiner—Sargon N Nano
(74) Attorney, Agent, or Firm—Staas & Halsey LLP

(57) ABSTRACT

A service communication control system includes a user terminal connected to a user network. The service communication control system also includes communication gateway, a management server, and an application server connected to a communication carrier network. The communication using a communication protocol dedicated for the application service is performed between the user terminal and the application server through the communication gateway as a substitute. Thus, the user terminal need not be aware of the protocol.

14 Claims, 13 Drawing Sheets

FOREIGN PATENT DOCUMENTS

WO  99/16203  4/1999
WO  2006/072988  7/2006

OTHER PUBLICATIONS

Malli, M, et al., "An Efficient Approach for Content Delivery in Overlay Networks"; Consumer Communications and Networking Conference 2005; pp. 128-133.

Van Lingers F. et al. "The Clarens Web Service Framework for Distributed Scientific Analysis in Grid Projects" Proceedings of 2005 International Conference on Parallel Processing Workshops; Jun. 14, 2005; 8pgs.

Partial European Search Report for corresponding European Application 07002006.0-1244; issued Jul. 8, 2010.

* cited by examiner

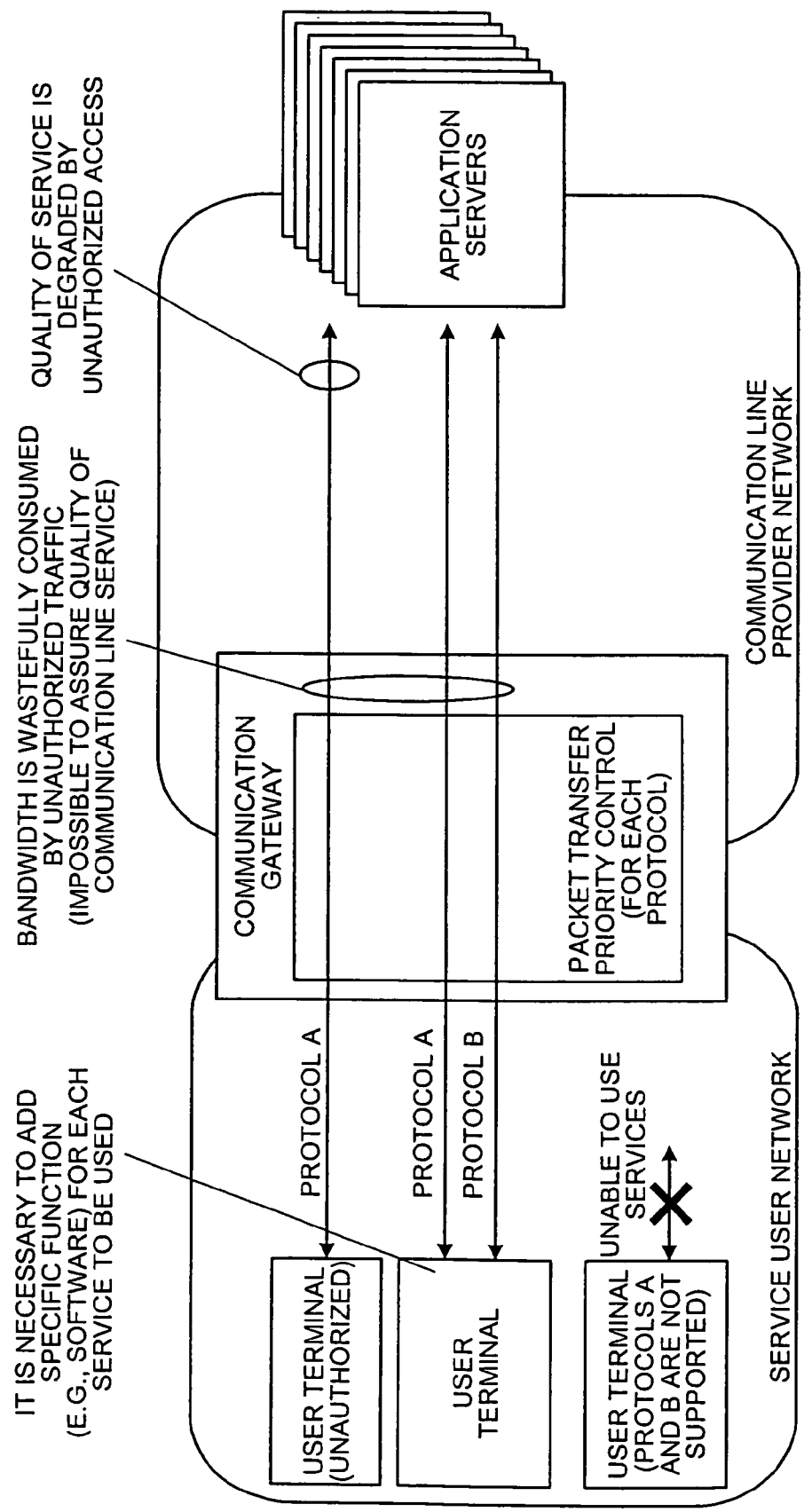

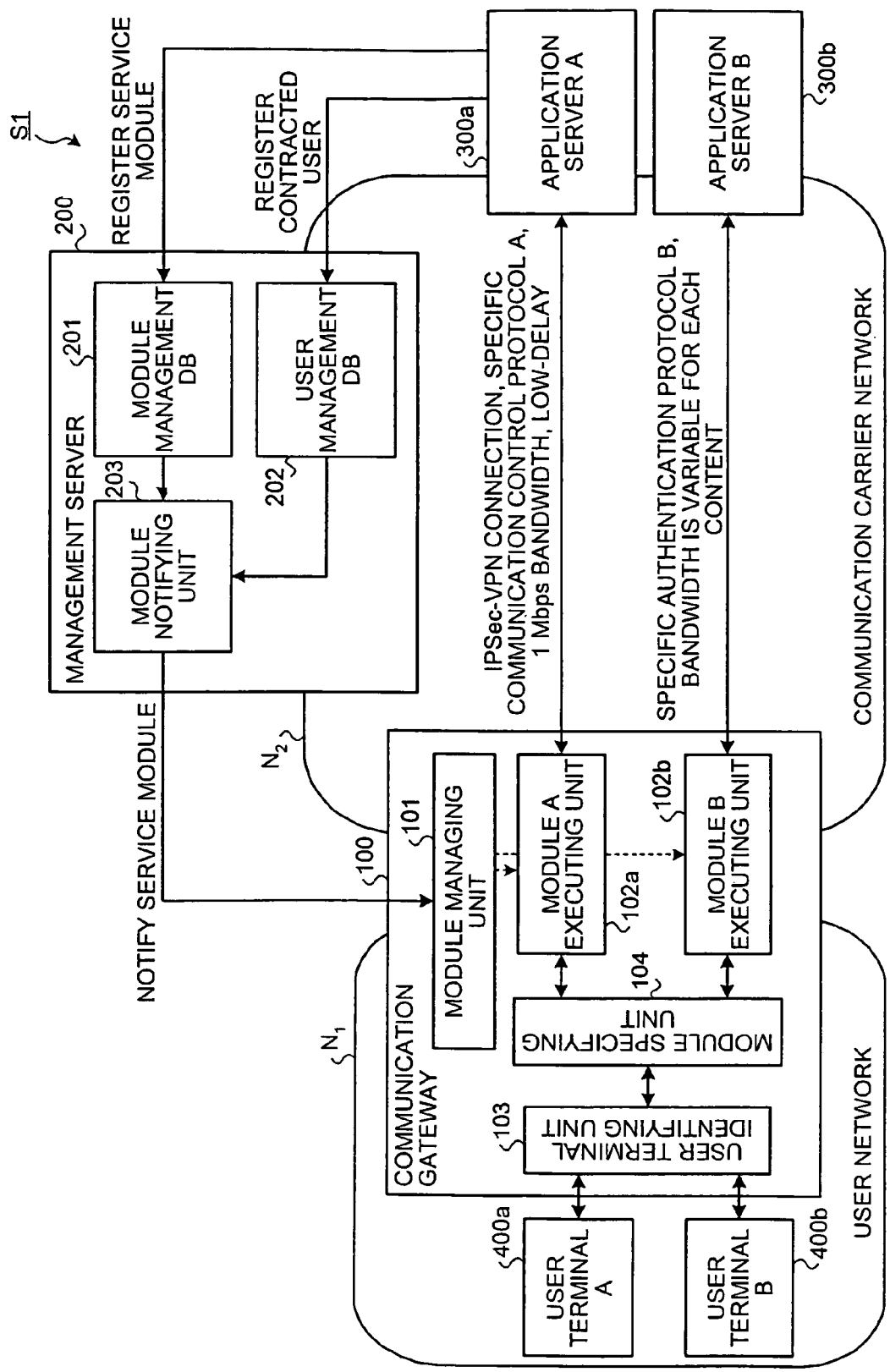

FIG.3

| MODULE ID | METADATA | SERVICE-MODULE DATA |
|---|---|---|
| xxx-xxx-00A | xxx-xxx-00A.metadata | xxx-xxx-00A.java |
| xxx-xxx-00B | xxx-xxx-00B.metadata | xxx-xxx-00B.c |
| xxx-xxx-00C | xxx-xxx-00C.metadata | xxx-xxx-00C.script |
| ⋮ | ⋮ | ⋮ |
| xxx-xxx-00W | xxx-xxx-00W.metadata | xxx-xxx-00W.java |
| xxx-xxx-00X | xxx-xxx-00X.metadata | xxx-xxx-00X.java |
| xxx-xxx-00Y | xxx-xxx-00Y.metadata | xxx-xxx-00Y.script |
| xxx-xxx-00Z | xxx-xxx-00Z.metadata | xxx-xxx-00Z.c |
| ⋮ | ⋮ | |

FIG.4

| USER ID | COMMUNICATION GATEWAY | INTRODUCED SERVICE MODULE ID |
|---|---|---|
| UID-xxx-xxx-X | xxx-xxx-xxx-X | xxx-xxx-00C<br>xxx-xxx-00W<br>xxx-xxx-00Z |
| UID-xxx-xxx-Y | xxx-xxx-xxx-Y | xxx-xxx-001.java<br>xxx-xxx-059.java |
| ⋮ | ⋮ | ⋮ |

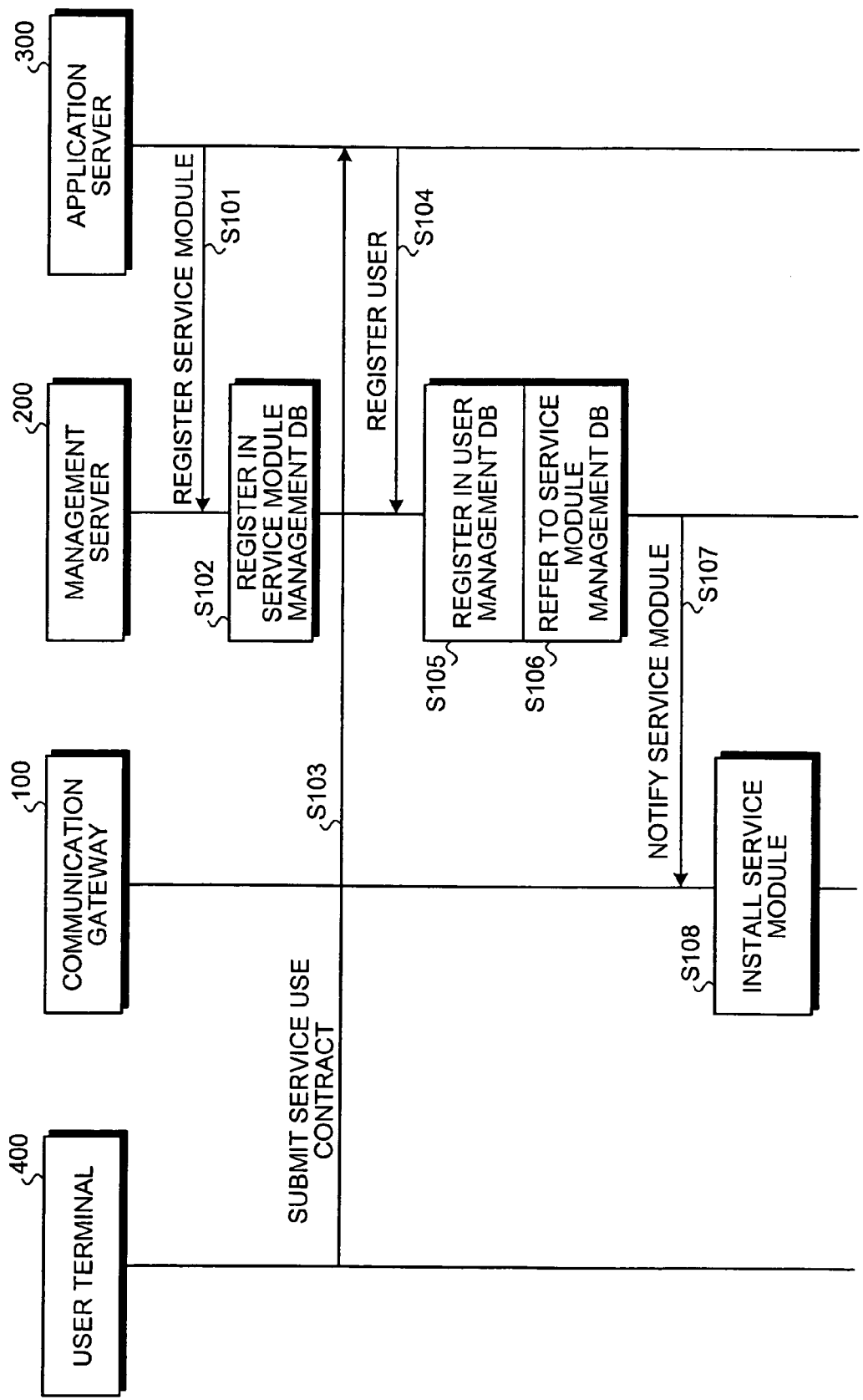

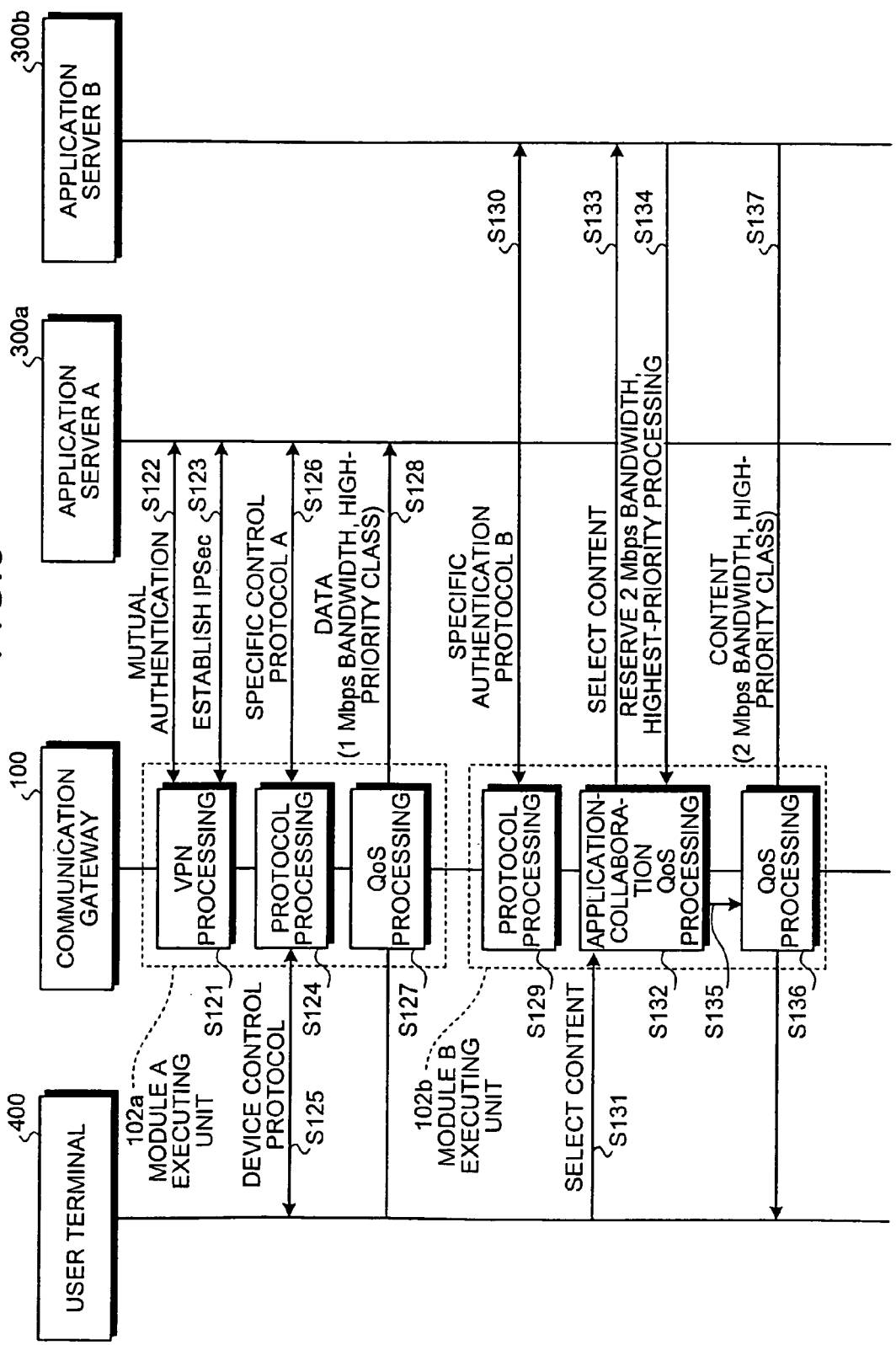

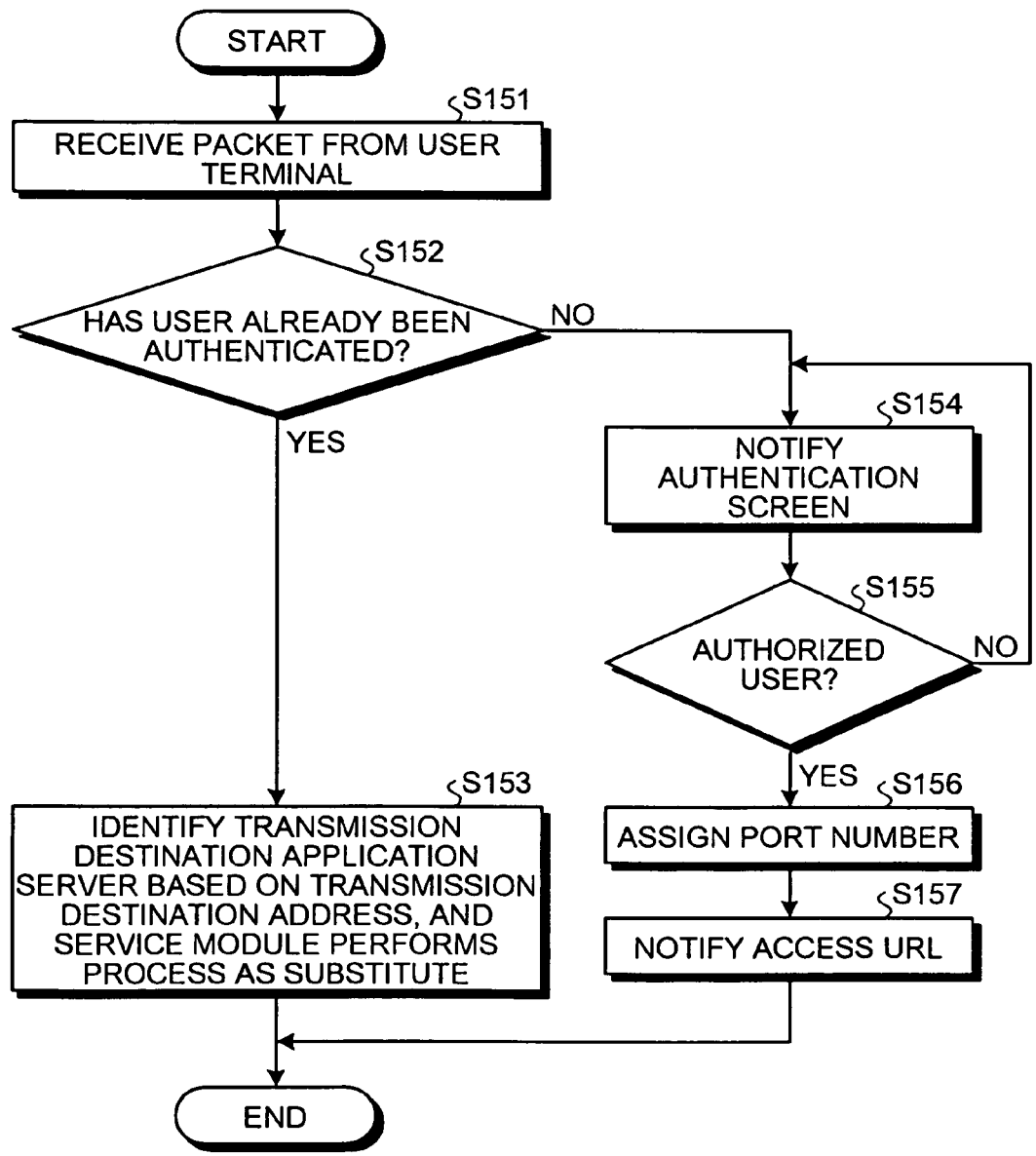

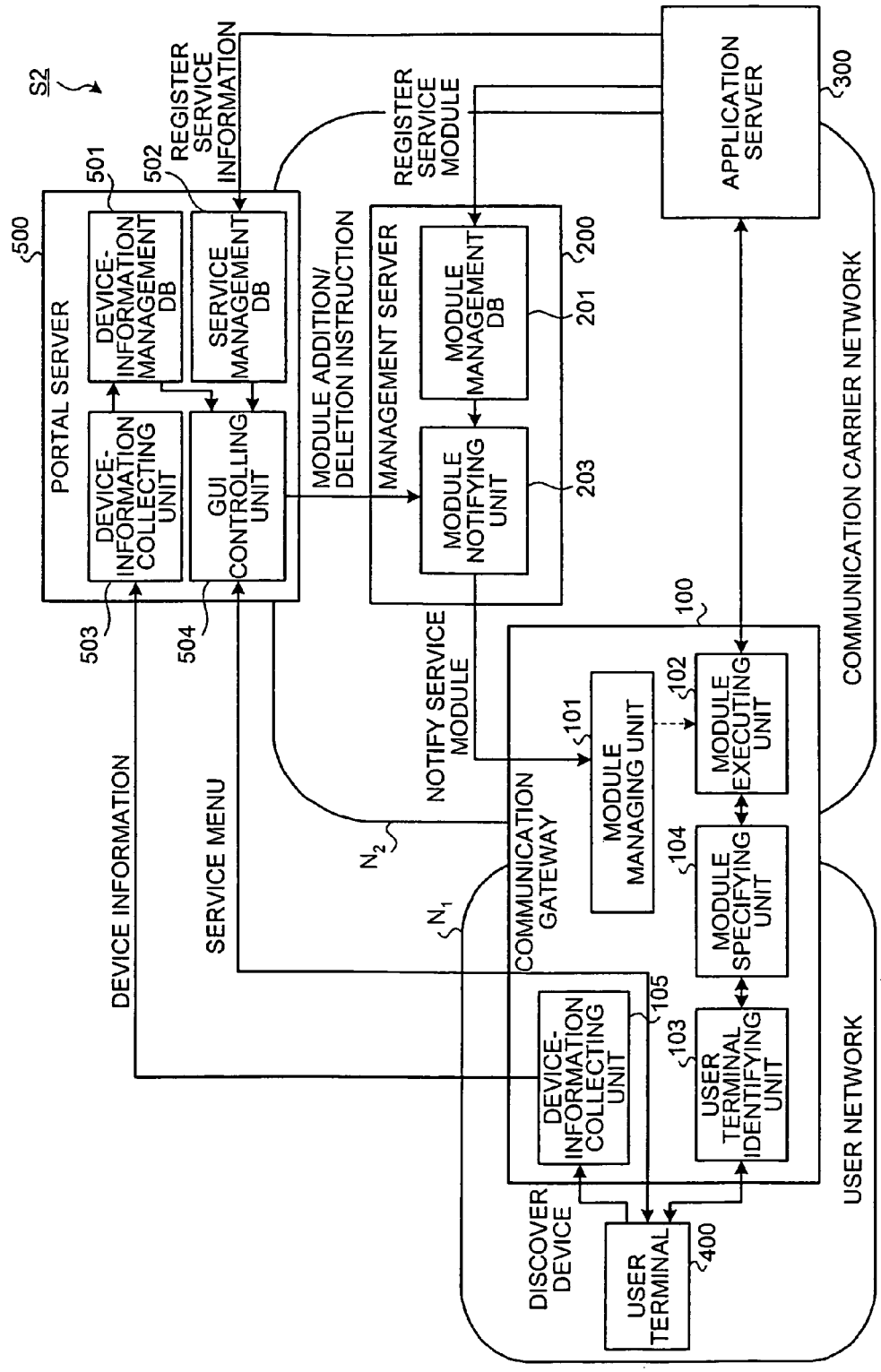

FIG.12

| SERVICE | SERVICE USE CONDITION (NECESSARY DEVICE) | ID OF SERVICE MODULE TO BE USED |
|---|---|---|
| SERVICE A | xxx-xxx-xxx-xxx | xxx-xxx-00C<br>xxx-xxx-00E |
| SERVICE B | xxx-xxx-xxx-yyy | xxx-xxx-00F<br>xxx-xxx-00I |
| SERVICE C | xxx-xxx-xxx-zzz | xxx-xxx-00Z |
| ⋮ | ⋮ | ⋮ |

FIG.13

| USER ID | OWNED DEVICES | | | |
| | TYPE | MODEL NAME | MANUFACTURER | OTHER INFORMATION |
|---|---|---|---|---|
| UID-xxx-xxx-X | xxx-xxx-xxx<br>xxx-xxx-yyy<br>xxx-xxx-zzz | zzz-zzz-wkb<br>zzz-zzz-fde<br>zzz-zzz-jht | MANUFACTURER A<br>MANUFACTURER B<br>MANUFACTURER C | |
| UID-xxx-xxx-Y | xxx-xxx-xxx<br>xxx-xxx-012 | zzz-zzz-dfr<br>zzz-zzz-gyk | MANUFACTURER M<br>MANUFACTURER D | |
| UID-xxx-xxx-Z | xxx-xxx-345<br>xxx-xxx-678 | zzz-zzz-khe<br>zzz-zzz-fer | MANUFACTURER A<br>MANUFACTURER H | |
| ⋮ | ⋮ | ⋮ | ⋮ | ⋮ |

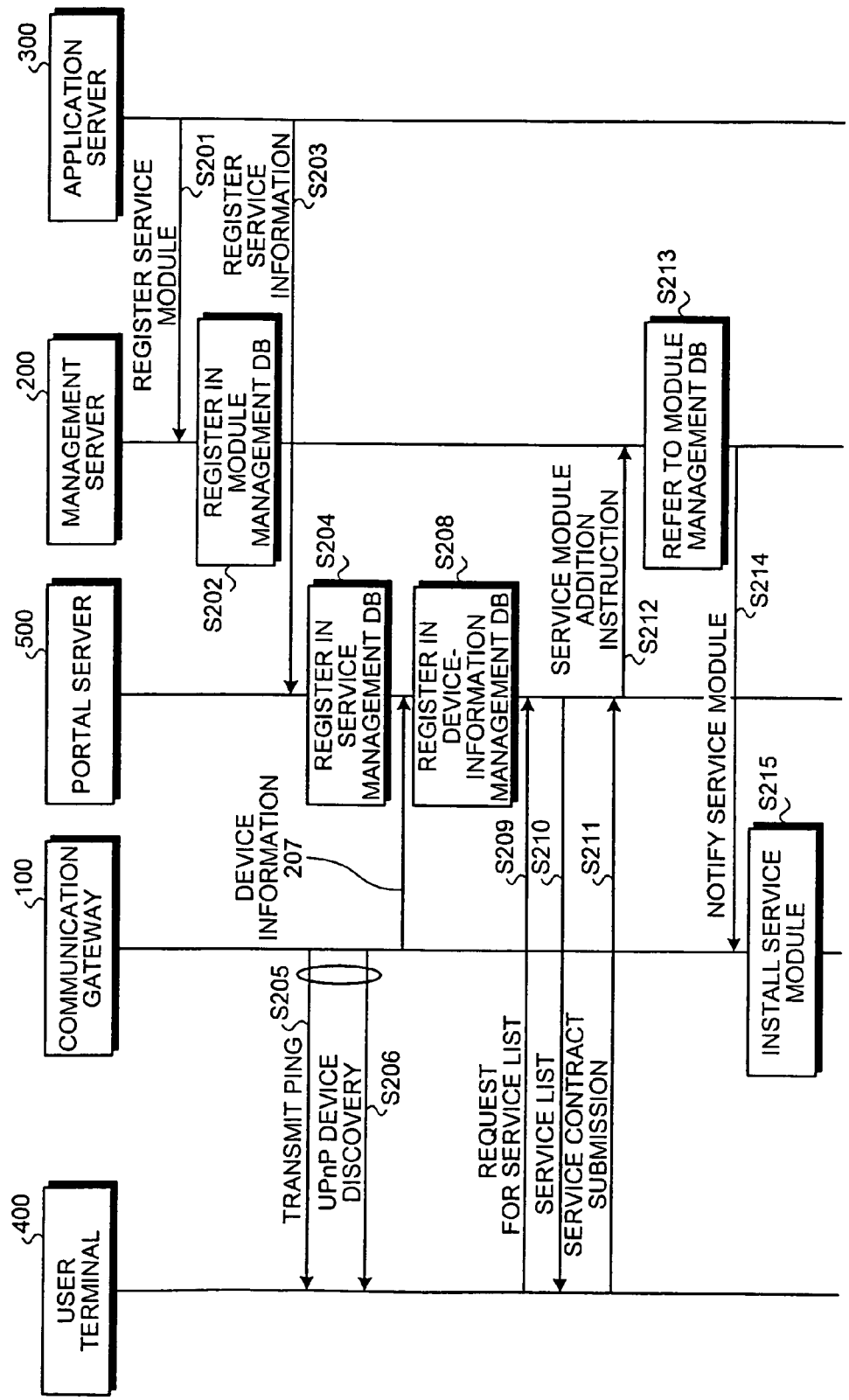

SERVICE COMMUNICATION CONTROL METHOD, SERVICE RELAYING APPARATUS, MANAGEMENT SERVER, PORTAL SERVER, AND SERVICE COMMUNICATION CONTROL SYSTEM

CROSS REFERENCE TO RELATED APPLICATION

This application claims the benefit under 35 U.S.C. Section 119, of Japanese Patent Application No. 2006-251732, filed Sep. 15, 2006, which is hereby incorporated by reference in its entirety into this application.

BACKGROUND OF THE INVENTION

1. Field of the Invention

The present invention relates to a technology for providing service from a service providing device to a service user terminal via the service relaying apparatus.

2. Description of the Related Art

There had been technologies to realize the Internet services by a combination of communication line services provided by communication carriers and application services provided by service providers. In such conventional technologies, application software corresponding to an application service to be used is installed on a service user terminal, so that the application software communicates with an application server that provides the application service using a predetermined protocol. Thus, various types of applications become available on the service user terminal device.

It has becomes an important issue how to assure quality of communication for the application services. For example, Japanese Patent Application Laid-open No. 2004-341583 discloses a method for controlling quality of communication. According to the conventional method, passing packets are sorted by identifying transmission destinations and applications based on the destination addresses and the port numbers of the packets in a communication relaying apparatus such as a communication gateway, so that the quality of communication between application software and the application server can be assured.

However, with conventional technologies including the one mentioned above, a protocol related to the communication is exchanged between the service user terminal and the application server. The communication relaying apparatus only performs network layer processing to transfer communication packets.

Accordingly, every time a new application service starts being used, application software corresponding to the application service needs to be installed on the service user terminal and appropriate settings need to be made. This requires not only the cumbersome operation of installing the application software and making the appropriate settings, but also, in some cases, specialized knowledge for installing and setting up the application software. Consequently, it is difficult to start using a new application service.

Further, due to the recent development in ubiquitous computing, various types of information appliances having a microcomputer have become available. It is not possible for a user to add and install new application software on the information appliance, unlike personal computers to which users have been able to add new application software. Furthermore, it is often the case that personal computers are connected to intranets, and installation of new software is restricted for security reasons.

Thus, a problem arises where it is impossible or difficult to use a new application service if it is impossible or difficult to install application software corresponding to the new application service on a service user terminal.

With regard to assuring the quality of communication in the application service, it has not been possible, with the conventional technologies, to block unauthorized access from a service user terminal because the communication relaying apparatus only transfers communication packets and is not at all involved with the application protocol.

Further, when the application software required in the communication of the application service is managed for each service user terminal, while the communication relaying apparatus only relays communication packets, if a failure occurs, it is difficult to identify a cause of the failure. This also makes it difficult to assure the quality of communication in the application service.

SUMMARY OF THE INVENTION

It is an object of the present invention to at least partially solve the problems in the conventional technology.

According to an aspect of the present invention, a service communication control method for providing an application service from a service providing device to a service-user terminal via a service relaying apparatus, includes the service relaying apparatus requesting the service providing device to provide a service in response to a request from the service-user terminal, and the service relaying apparatus relaying communication between the service providing device and the service-user terminal with a protocol corresponding to the service to provide the service to the service-user terminal.

According to another aspect of the present invention, a service relaying apparatus that relays a service provided from a service providing device to a service-user terminal, includes a service relaying unit that requests the service providing device to provide a service in response to a request from the service-user terminal, and relays communication between the service providing device and the service-user terminal with a protocol corresponding to the service to provide the service to the service-user terminal.

According to still another aspect of the present invention, a management server that is located between a service providing device and a service relaying apparatus to provide an application service from the service providing device to a service-user terminal via the service relaying apparatus, includes a program managing unit that manages a communication control program provided by the service providing device and used for relaying communication between the service-user terminal and the service providing device, a user managing unit that manages a user who subscribes to service provided by the service providing devices together with program identification information of the communication control program necessary for the service, and a program notifying unit that reads the communication control program based on the program identification information, and notifies the service relaying apparatus of the communication control program.

According to still another aspect of the present invention, a portal server that is located between a service providing device and a service relaying apparatus to provide an application service from the service providing device to a service-user terminal via the service relaying apparatus, includes an attribute-information managing unit that receives terminal-attribute information of service-user terminals collected by the service relaying apparatus and manages the terminal-attribute information for respective users, a service managing unit that manages service information including identification information of the communication control program and use condition required to use the service notified by the service providing device, and a service list control unit that creates a list of services available for the respective users on the service-user terminals based on the terminal-attribute information and the service information, and displays the list to allow each user to select a service from the list on the service-user terminal.

According to still another aspect of the present invention, a service communication control system includes a service relaying apparatus, and a service providing device that provides an application service to a service-user terminal via the service relaying apparatus. The service relaying apparatus includes a service relaying unit that requests the service providing device to provide a service in response to an authorized request from the service-user terminal, and relays communication between the service providing device and the service-user terminal with a protocol corresponding to the service to provide the service to the service-user terminal.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a schematic for explaining problems in a conventional service communication control method;

FIG. 2 is a schematic of a service communication control system according to a first embodiment of the present invention;

FIG. 3 is an example of contents of a service module management table;

FIG. 4 is an example of contents of a user management table;

FIG. 5 is a sequence diagram of a service module notification process according to the first embodiment;

FIG. 8 is a sequence diagram of a service use process;

FIG. 9B is a flowchart of another example of a user authentication process;

FIG. 11 is a schematic of a service communication control system according to a second embodiment of the present invention;

FIG. 12 is an example of contents of a service management table;

FIG. 13 is an example of contents of a device-information management table; and

FIG. 14 is a sequence diagram of a service module notification process according to the second embodiment.

DETAILED DESCRIPTION OF THE PREFERRED EMBODIMENTS

Figure 6:
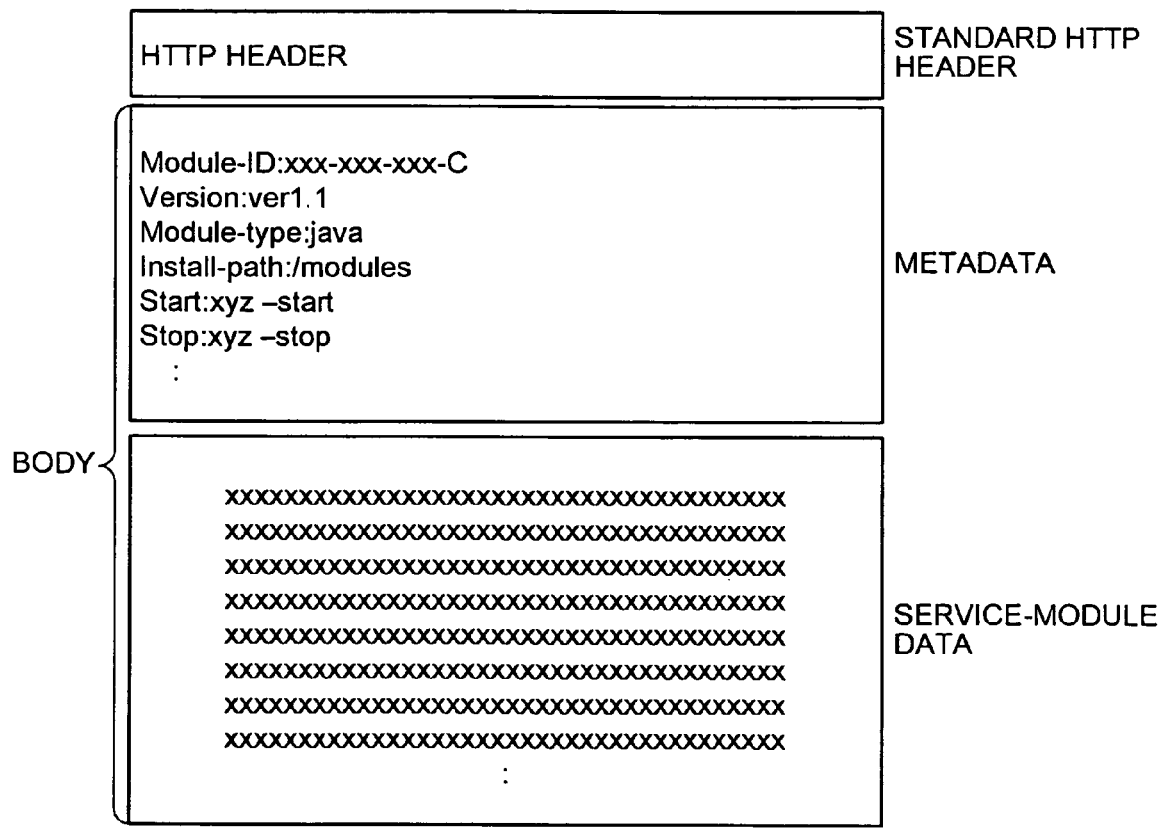
FIG. 6 is an example of a service module notification message.

Exemplary embodiments of the present invention will be explained in detail with reference to the accompanying drawings. In the embodiments described below, "service" indicates an application service, and, for example, a terminal device for using the application service is an information appliance such as an electronic appliance having a microcomputer. However, the present invention is not limited to this example. The terminal device for using the application service can be a personal computer or a mobile phone terminal that is generally used.

FIG. 1 is a schematic for explaining problems in a conventional service communication control method. As shown in FIG. 1, a user network to which user terminals are connected is connected to a communication carrier network to which application servers are connected, via a communication gateway. The communication gateway is a communication apparatus that belongs to the communication carrier network and serves as a gateway to the communication carrier network.

According to the conventional method, it is possible to use an application service from each user terminal by communicating with one of the application servers, using a Protocol A or a Protocol B. In this situation, the communication gateway exercises transfer control and priority control of the packets, for each of the protocols.

If an unauthorized user terminal attempts to communicate with one the application servers by falsely using the Protocol A, the communication gateway cannot block the unauthorized access and only exercises transfer control of the packets by simply regarding them as communication packets using the Protocol A. As a result, on the application server side, the quality of service is degraded by the unauthorized access. In addition, the communication gateway has its communication bandwidth wastefully consumed by the traffic of the unauthorized access. Thus, the quality of the communication line service is lowered.

Also, even if an authorized user terminal is used, when the user terminal supports neither the Protocol A nor the Protocol B, the user terminal cannot communicate with the application server. For example, when the user terminal starts receiving a new application service from the application server, if the user terminal does not support the protocol required in the communication related to the application service, the user terminal needs to have the protocol introduced and to support the protocol. In other words, when the user terminal is to receive application services from a plurality of application servers that use mutually different protocols in the communication, the user terminal needs to have each of the protocols that are respectively related to the communication with the application servers introduced and to support the protocols. This situation makes it difficult to start using a new application service because introducing and setting up the protocol requires professional knowledge.

FIG. 2 is a schematic of a service communication control system S1 according to a first embodiment of the present invention. The service communication control system S1 includes a user network $N_1$ and a communication carrier network $N_2$ that are connected to each other via a communication gateway 100.

A user terminal A 400a and a user terminal B 400b are connected to the user network $N_1$. The communication gateway 100, a management server 200, an application server A 300a, and an application server B 300b are connected to the communication carrier network $N_2$. Although only two application servers, i.e., the application server A 300a and the application server B 300b, are shown in FIG. 2, there can be a larger number of application servers. Also, although only two user terminals, i.e., the user terminal A 400a and the user terminal B 400b, are shown in FIG. 2, there can be a larger number of user terminals.

The communication gateway 100 includes a module managing unit 101, a module A executing unit 102a, a module B executing unit 102b, a user terminal identifying unit 103, and a module specifying unit 104.

The module managing unit 101 stores therein and manages a service module notified by the management server 200. The service module in this example indicates an executable format of a communication control program that controls the communication with an application server, using a predetermined corresponding protocol.

The module A executing unit 102a executes the service module A in an executable format stored in and managed by the module managing unit 101 and generates a process. The module A executing unit 102a is a communication interface used for performing communication with the application server A 300a.

The module A executing unit 102a especially controls the communication with the application server A 300a according to a specific communication method (e.g., as shown in the drawing, using a Security Architecture for Internet Protocol Security (IPSec)-Virtual Private Network (VPN) connection with a bandwidth of 1 Mbps, and low-delay) and using a communication protocol (e.g., as shown in the drawing, a specific communication control protocol A).

More specifically, the service A provided by the application server A 300a is a service that constructs an IPSec-VPN between the application server A 300a and the module A executing unit 102a, to control the user terminal A 400a within the user network $N_1$ from the application server A 300a, using the protocol A, which is a protocol unique to the service provider, through an IPSec tunnel (an encrypted path), and to notify the application server A 300a of information on the user terminal A 400a (For example, a service in which a network camera is controlled to notify an application server functioning as an image management center of an image taken by the camera).

The module A executing unit 102a transmits communication data that has been forwarded, while the service module A being identified, from the module specifying unit 104, to the application server A 300a and also forwards received data that has been received from the application server A 300a to the module specifying unit 104.

The module B executing unit 102b is a communication controlling unit that executes an executable format of the service module B stored in and managed by the module managing unit 101 and generates a process. The module A executing unit 102b is a communication interface used for performing communication with the application server B 300b. The module B executing unit 102b especially controls the communication with the application server B 300b according to a specific communication method (e.g., as shown in the drawing, using a bandwidth that is variable for each content) and using a communication protocol (e.g., as shown in the drawing, a specific authentication protocol B).

More specifically, the service B provided by the application server B 300b is a service (e.g., a high-quality Video on Demand (VOD). service) that performs mutual authentication between the application server B 300b and the module B executing unit 102b, using a specific protocol that realizes an authentication method unique to the service provider (e.g., an authentication method with which a strict authentication process is performed by combining a plurality of elements such as a device-unique ID or a personal preference parameter, in addition to a user ID/a password) to allow only authorized service users to use the service, and when a service user has selected a content from the application server B 300b, the communication gateway 100 is notified of a level of network quality that is necessary for distributing the selected content using the specific authentication protocol B, and the content is distributed in a network of which the quality is assured.

The module B executing unit 102b transmits communication data that has been forwarded, while the service module B being identified, from the module specifying unit 104, to the application server B 300b and also forwards received data that has been received from the application server B 300b to the module specifying unit 104.

As explained above, the module A executing unit 102a is a service module instance that executes the service module A used in the communication with the application server A 300a. The module B executing unit 102b is a service module instance that executes the service module B used in the communication with the application server B 300b.

The user terminal identifying unit 103 is a communication interface used in the communication with user terminals. The user terminal identifying unit 103 identifies which one of the user terminal A 400a and the user terminal B 400b the communication is performed with, based on, for example, the Media Access Control (MAC) address of each user terminal device. The user terminal identifying unit 103 performs communication using a communication protocol that is always the same, no matter which one of the user terminals the communication is performed with. The user terminal identifying unit 103 receives, from one of the user terminals, communication data in which a connection destination application server is specified and forwards the received communication data to the module specifying unit 104 and also forwards communication data that has been forwarded from the module specifying unit 104 to one of the user terminals that is specified in the communication data.

The module specifying unit 104 selects, upon receiving the communication data that has been forwarded from the user terminal identifying unit 103, a service module that is necessary for performing communication with the specified connection destination application server and forwards the received communication data to the selected service module. The module specifying unit 104 receives, from the user terminal identifying unit 103, the communication data in which the connection destination application server is specified, and forwards the communication data to the identified service module and also forwards communication data that has been forwarded from the service module to the user terminal identifying unit 103.

The module specifying unit 104 selects the service module that is necessary for performing communication with the connection destination application server. Accordingly, communication control is exercised with a behavior that varies depending on the application service to be used.

Because the communication gateway 100 is configured this way, it is possible to identify an application service being a transmission destination/a transmission source of the traffic that goes through the communication gateway 100 and to use a communication controlling means that corresponds to the identified application service. Further, on behalf of the service user terminal, the communication gateway 100 cannot use the unique communication protocol that is defined by the application service provider and can also control the traffic that flows in and out through the communication gateway so that the communication quality defined by the service provider is satisfied. In addition, it is possible to identify the service users and apply restrictions so that only authorized users can access the application service for which they have signed a contract.

As explained above, because the communication gateway 100, acting as a substitute, performs the necessary process related to the communication of the application services, the service user terminals can use application services having various specifications without having to add specific functions to the service user terminals. In addition, the communication gateway 100 identifies the users and controls the traffic that flows in and out through the communication gateway 100. Thus, the communication carrier can assure the quality of the communication line service. Further, the communication controlling means used in the service for which each service user has signed a contract is notified to the communication gateway 100 in an on-demand manner, so that the communication gateway function is customized for each service user. Thus, it is possible to flexibly accommodate various types of services, using a single apparatus (the communication gateway 100).

The management server 200 includes a module management database (DB) 201, a user management DB 202, and a module notifying unit 203. The module management DB 201 stores therein and manages an executable format of a service module that has been requested to be registered by the application server and has been registered. The management server 200 is a database that stores therein, in a predetermined table format, an executable format of a service module received from an application server via a predetermined communication interface, in such a manner that the application service required in the communication is identifiable. The module management DB 201 forwards the executable format of the service module to the module notifying unit 203.

The user management DB 202 is a storing unit that stores therein and manages identification information of contracted users for each application service, the identification information having been notified by the application servers. This example is based on an assumption that a contract for using each application service has been signed in advance between the application server and the user terminal. Due to this contract, the identification information of the contracted user that has been registered in the application server is registered in the user management DB 202. The user management DB 202 is a database that stores therein, in a predetermined table format, identification information of each contracted user that has been received from an application server via a predetermined communication interface, in such a manner that the contracted application service is identifiable, together with identification information of the communication gateway used by the contracted user. The user management DB 202 forwards the information of each contracted user that is stored and managed by the user management DB 202, to the module notifying unit 203.

Based on the information forwarded from the module management DB 201 and the user management DB 202, the module notifying unit 203 transmits, to the module managing unit 101 of the communication gateway 100, the identification information of each user who has signed the contract for using the application service, in correspondence with the identification information of the communication gateway used by the contracted user as well as the executable format of the service module required in the contracted application service.

FIG. 3 is an example of contents of a service module management table stored in the module management DB 201. The service module management table has columns for module IDs, metadata, and service-module data.

The "module ID" indicates identification information that uniquely identifies a service module being stored. The "metadata" indicates a data set including information that is associated with the stored module. The metadata includes the type of the module, the installing path information for the module, a run command, a stop command, and the like. The "service-module data" indicates an executable format of the service module identified by the module ID. The module IDs, the pieces of metadata, and the pieces of service-module data are in a "1:1:1" correspondence.

FIG. 4 is an example of contents of a user management table stored in the user management DB 202. The user management table has columns for user IDs, communication gateways, and introduced service module IDs.

The "user ID" indicates identification information for identifying a user who has signed a contract for using one of the application services. The "communication gateway" indicates identification information for identifying a communication gateway that is used by the user to communicate with the targeted application server after connecting to the communication carrier network $N_2$. The "introduced service module ID" indicates identification information for identifying a service module that has been notified to the module managing unit 101 so that the user can use the application service by communicating with one of the application servers. The user IDs and the communication gateways and the introduced service module IDs are in a "1:1:N (plural)" correspondence.

FIG. 5 is a sequence diagram of a service module notification process performed by the module notifying unit 203 to notify the module managing unit 101 of a service module. First, an application server 300 requests the module management DB 201 of the management server 200 to register an executable format of the service module (step S101.

Having received the data of the executable format of the service module from the application server 300, the module management DB 201 registers the received executable format of the service module in the service module management table stored in the module management DB 201 (step S102).

On the other hand, a contract for using the application service provided by the application server 300 is submitted from a user terminal 400 to the application server 300 (step S103). The contract for using the service is submitted using a method different from the method used in the communication of the application service; for example, a manually-operated method such as a postal service, electronic mail, or transmission via a web can be used.

Having received the submission of the contract for using the service, the application server 300 requests the user management DB 202 of the management server 200 to register the user (step S104). Having received user information to be registered from the application server 300, the user management DB 202 registers the received user information in the user management table stored in the user management DB 202 (step S105).

Subsequently, the module notifying unit 203 of the management server 200 refers to the module management DB 201 (step S106), and notifies the module managing unit 101 in the communication gateway 100 of the executable format of the service module required in the communication of the application service for which the user has signed the contract (step S107). Upon receiving the notification of the executable format of the service module, the module managing unit 101 installs the service module (step S108).

As a result, because the service module has been installed on the communication gateway, the communication gateway can communicate with the targeted application server by using the specified service module that corresponds to the request from the user terminal for a connection to the application server.

Next, a service module notification message shown at step S107 of FIG. 5 will be explained. FIG. 6 is an example of the service module notification message. The service module notification message includes a HyperText Transfer Protocol (HTTP) header, metadata, and service-module data.

The HTTP header is a standard HTTP header and includes information that indicates whether the message instructs addition of a module or deletion of a module. The metadata and the service-module data structure a body of the service module notification message. The metadata is a data set including information associated with the module being stored. The metadata includes at least a module ID that is information for uniquely identifying the module, a module type indicating the type of the module, the installing path information for the module, and information of a run command and a stop command. The service-module data is the data of an executable format of the service module.

As explained above, because the service module notification message includes the metadata, the communication gateway can uniquely identify the service module using the service module ID included in the metadata and to install and to run and stop the service module by referring to the type of the module, the service module installing path, and the run/stop instruction information included in the metadata. As a result, it becomes possible to deal with various types of service modules in an integrated manner, including a JAVA (registered trademark) application or a native code application such as a C-language application, libraries, and script files.

Figure 7:
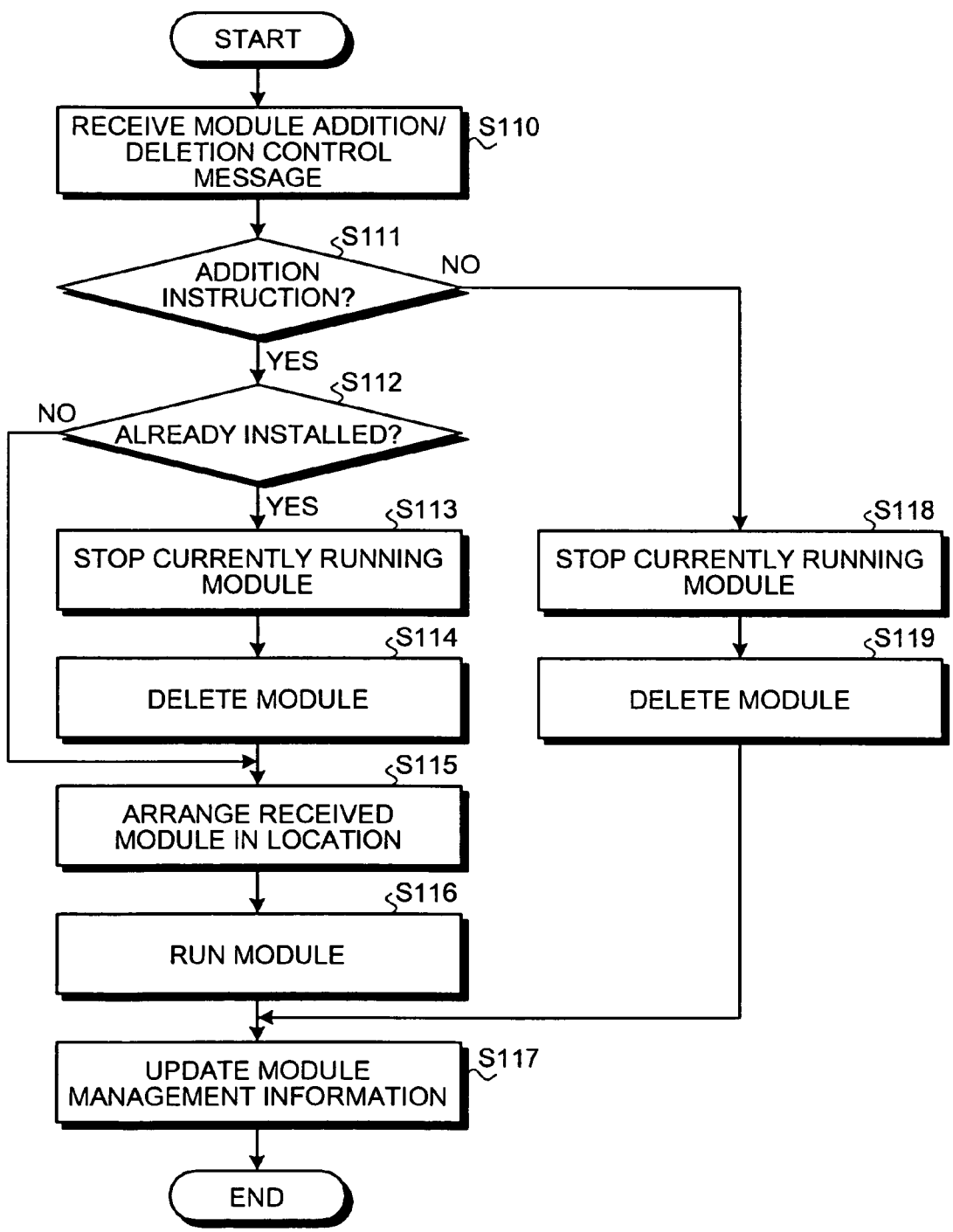
FIG. 7 is a flowchart of a service module management process.

Next, the service module management process performed in the service module installation process at step S108 of FIG. 5 will be explained. FIG. 7 is a flowchart of the service module management process. First, the module managing unit 101 of the communication gateway 100 receives a module addition/deletion control message (step S110). The module managing unit 101 judges whether the received message is an addition instruction (step S111). If the message is an addition instruction (Yes at step S111), the process proceeds to step S112. If the message is not an addition instruction (No at step S111), the process proceeds to step S118.

The module managing unit 101 judges whether the module indicated in the addition instruction has already been installed (step S112). If the module has already been installed (Yes at step S112), the process proceeds to step S113. If the module has not been installed (No at step S112), the process proceeds to step S115.

The module that is currently running is stopped by using the stop command included in the metadata (step S113). Subsequently, the location in which the module is stored is identified according to the installing path information included in the metadata, and the module is deleted (step S114). Then, the location in which the module is to be stored is identified according to the installing path information included in the metadata, and the received module is arranged on the location (step S115). Next, the module that has been arranged on the location is run using the run command included in the metadata (step S116). Subsequently, module management information that is stored in the module managing unit 101 and indicates the modules that have already been installed is updated (step S117).

When the received message is a module deletion instruction (step S118), the module that is currently running is stopped by using the stop command included in the metadata. Subsequently, the location in which the module is stored is identified according to the installing path information included in the metadata, and the module is deleted (step S119). When the process at step S119 is finished, the process proceeds to step S117.

FIG. 8 is a sequence diagram of a service use process performed when the service is used in the service communication control system S1. First, the module A executing unit 102a of the communication gateway 100 performs Virtual Private Network (VPN) processing to perform mutual authentication with the application server A 300a and to achieve IPSec by encrypting the communication data on an IP protocol level (step S121). As a result of the VPN processing, the communication gateway 100 and the application server A 300a are mutually authenticated (step S122), and an encrypted communication path according to the IPSec is established (step S123).

Subsequently, the module A executing unit 102a performs protocol processing to establish a communication session between the user terminal 400 and the application server A 300a (step S124). As a result of the protocol processing, a communication session according to a device control protocol is established between the communication gateway 100 and the user terminal 400 (step S125), and also a communication session according to a specific control protocol A is established between the communication gateway 100 and the application server A 300a (step S126).

Next, the module A executing unit 102a performs Quality of Service (QoS) processing to reserve a bandwidth and to set a priority level for the packet transmission (step S127). As a result of the processing, data communication is performed while the bandwidth and the level of priority are reserved (e.g., a bandwidth of 1 Mbps is reserved, and the setting is made for a high-priority class) between the user terminal 400 and the application server A 300a via the communication gateway 100 (step S128).

On the other hand, the module B executing unit 102b of the communication gateway 100 performs protocol processing to establish a communication session between the user terminal 400 and the application server B 300b (step S129). As a result of the protocol processing, a communication session according to the specific authentication protocol B is established between the communication gateway 100 and the application server B 300b (step S130).

Next, an instruction to select a content is transmitted from the user terminal 400 to the module B executing unit 102b (step S131). Having received the content selection instruction, the module B executing unit 102b performs application-collaboration QoS processing (Step S132). As a result of the application-collaboration QoS processing, the content selection instruction is forwarded to the application server B 300b (step S133).

Upon receiving the content selection instruction, the application server B 300b notifies the module B executing unit 102b of information related to the bandwidth and the priority level for the packet transmission that correspond to the selected application (step S134).

When module B executing unit 102b receives the bandwidth and the priority level for the packet transmission that correspond to the selected application from the application server B 300b, by the application-collaboration QoS processing, what has been received by the module B executing unit 102b is forwarded to QoS processing (Step S135).

Subsequently, the module B executing unit 102b performs the QoS processing to reserve the bandwidth and to set the priority level for the packet transmission (step S136). As a result of the processing, data communication is performed while the bandwidth and the level of priority are reserved (e.g., a bandwidth of 2 Mbps is reserved, and the setting is made for a high-priority class) between the user terminal 400 and the application server B 300b via the communication gateway 100 (step S137).

As explained above, the service module that corresponds to each of the application services is added to the communication gateway 100 in an on-demand manner. Thus, even if the service user terminal does not have the necessary function, the service user terminal can accommodate various types of services. Thus, it is possible to provide a service in which application layer processing and network quality control processing are achieved in collaboration.

Figure 9A:
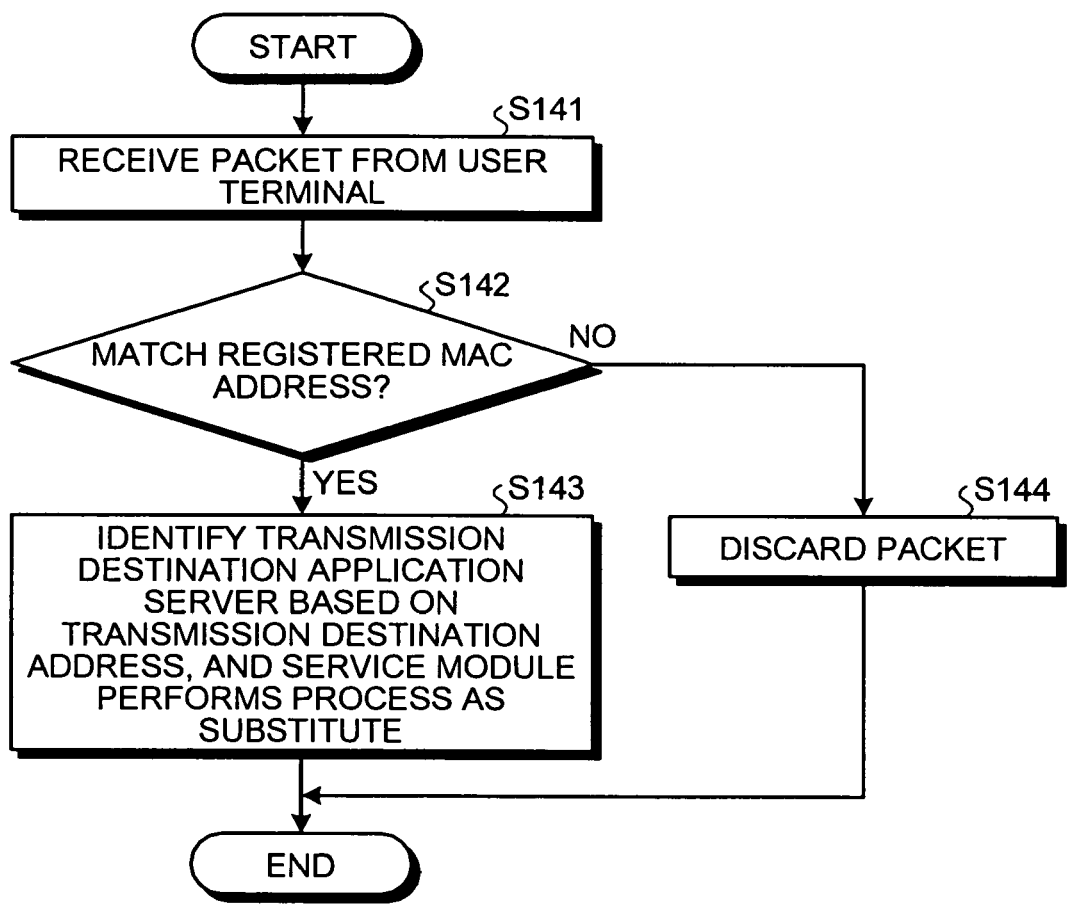
FIG. 9A is a flowchart of an example of a user authentication process.

FIG. 9A is a flowchart of a user authentication process performed by the communication gateway 100 to authenticate a user of the user terminal 400 when a communication packet has been transmitted from the user terminal 400 to the communication gateway 100 to use the service in the service use process shown in FIG. 8. The process shown in FIG. 9A is based on an assumption that the MAC address of each of the service user terminals has been registered in advance in the communication gateway 100, as information of the service user terminals that have been permitted to use the service. First, the user terminal identifying unit 103 of the communication gateway 100 receives a packet from a user terminal (step S141).

Subsequently, the user terminal identifying unit 103 of the communication gateway 100 judges whether the Media Access Control (MAC) address of the transmission source terminal device included in the received packet matches any of the MAC addresses that have been registered in the communication gateway 100 (step S142). When the MAC address in the received packet matches one of the registered MAC addresses (Yes at step S142), the user terminal identifying unit 103 identifies the transmission destination application server, based on the transmission destination address, and the corresponding service module performs communication as a substitute (step S143). When the MAC address in the received packet matches none of the registered MAC addresses (No at step S142), the user terminal identifying unit 103 discards the received packet and makes sure that the user cannot use any of the application services (step S144). When the process at one of step S143 and step S144 is finished, the user authentication process ends.

Instead of the process at step S144 in which the packet is discarded, usable services can be preset for each service user terminal so that the service user terminal is allowed to use only the limited services.

As explained above, when a service user has made access to the communication gateway 100 in an attempt to use an application service by using the user terminal 400, because the communication gateway 100 can identify the user terminal 400 by using the MAC address, only the identified user terminal 400 can communicate with the desired application server 300 by using the service module. Thus, it is possible to eliminate any unauthorized user terminal 400 to block unauthorized access to the application server 300, and to improve the security related to the application service.

FIG. 9B is a flowchart of another example of the user authentication process. In this example, even if the service user terminal is permitted to use services in advance, usable services are limited with respect to each service user. As in the example shown in FIG. 9A, this example is also based on an assumption that service users and their respective usable services have been registered in the communication gateway 100 in advance. First, the user terminal identifying unit 103 receives a packet from a user terminal (step S151).

Subsequently, the user terminal identifying unit 103 judges whether the user who is using the transmission source user terminal of the received packet has already been authenticated based on session information in the traffic transmitted from the user network $N_1$ side to the outside such as the Internet (step S152). If the user has been authenticated (Yes at step S152), the user terminal identifying unit 103 identifies a transmission destination application server based on the transmission destination address, and the corresponding service module performs communication as a substitute (step S153).

On the other hand, if the user has not been authenticated (No at step S152), the user terminal identifying unit 103 notifies the user terminal of a Uniform Resource Locator (URL) of an authentication screen so that authentication information such as a user ID and a password can be input and transmitted to the communication gateway 100 (step S154). Upon receiving the authentication information, the user terminal identifying unit 103 judges whether the user is an authorized user (step S155). If the user is an authorized user (Yes at step S155), a communication port number used for accessing the service is assigned to the user (step S156), and notifies the user terminal used by the user of an access URL (e.g., http://gateway:12345/service-c.html; in this example, "12345" indicates the port number assigned to the user.) (step S157). When the process at one of step S153 and step S157 ends, the user authentication process ends.

As explained above, the communication gateway 100 manages port numbers that have been assigned and judges whether the transmission destination port number in the packet transmitted from the service user terminal matches any of the port numbers managed by the communication gateway 100. Thus, the communication gateway 100 can judge whether the user is an authorized user or an unauthorized/unauthenticated user.

As a method for identifying a session without using a port number, another arrangement is acceptable in which Cookie information including a session identifier assigned to the user is notified when the service use URL information is notified, so that it is possible to judge whether the user is an authorized user by referring to the session identifier included in the Cookie information in a message transmitted from a service user terminal.

As explained above, when a service user has made access to the communication gateway 100 in an attempt to use an application service by using the user terminal 400, because the communication gateway 100 performs the user authentication, only authenticated users can use their desired application services using the service module. Thus, it is possible to eliminate any unauthorized user terminal 400 to block unauthorized access to the application server 300, and to improve the security related to the application service.

Figure 10:
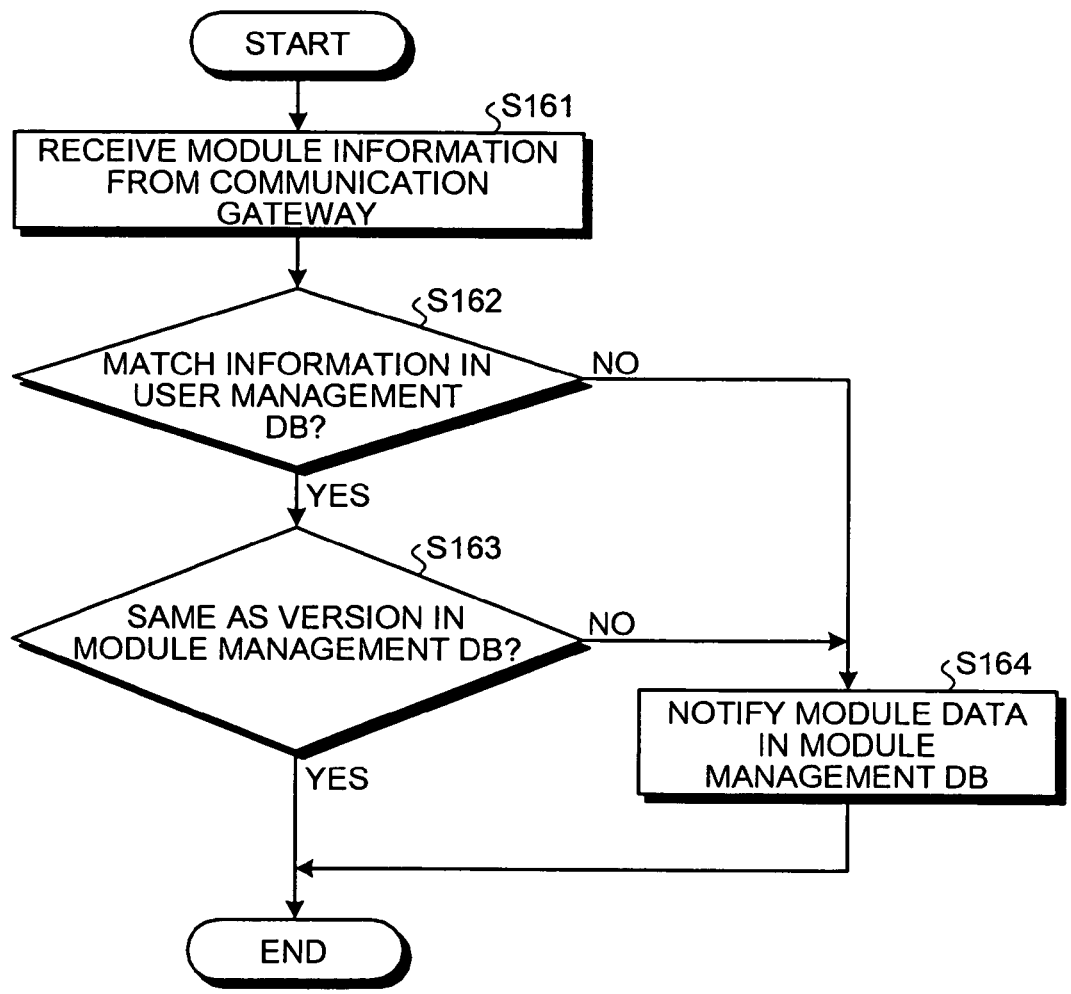
FIG. 10 is a flowchart of a module update checking process.

FIG. 10 is a flowchart of an automatic update process for the modules registered in the module managing unit 101 of the communication gateway 100 in the service communication control system S1. An object of the module update checking process, i.e., an automatic update process, is to always keep the latest version of a module in the module managing unit 101 of the communication gateway 100 by checking the module information included in the metadata of the module. The module update checking process related to the automatic update process of the module is performed periodically and automatically.

When the communication gateway 100 is initialized for some reason, the service module in the communication gateway 100 may disappear, and it may become impossible to use the service. In addition, the specification of the service module may be changed due to a problem that the service provider has. To cope with these situations, it is necessary to have a mechanism for automatically recovering the service module in the communication gateway 100 and for automatically updating the service module with most updated information notified from the management server 200 side.

First, the module notifying unit 203 of the management server 200 receives module information from the module managing unit 101 of the communication gateway 100 (step S161). The module information includes at least a module ID, version information, a user ID, and apparatus identification information of the communication gateway in which the module is registered.

Subsequently, the module notifying unit 203 refers to the user management DB 202 based on the module ID, the user ID and the apparatus identification information of the communication gateway in the received module information, and judges whether information that matches the information included in the received module information has been registered in the user management DB 202 (step S162). If the information that matches the module information has been registered (Yes at step S162), the process proceeds to step S163. If the information that matches the module information has not been registered (No at step S162), the process proceeds to step S164.

The module notifying unit 203 refers to the module management DB 201 and judges whether the version of the module matches the version registered in the module management DB 201 (step S163). If the version of the module matches the version registered in the module management DB 201 (Yes at step S163), the module update checking process ends. If the version of the module does not match the version registered in the module management DB 201 (No at step S163), the module managing unit 101 is notified of the module data of the module registered in the module management DB 201 (step S164). When the process at step S164 ends, the module update checking process ends.

As explained above, the information of the service module managed by the communication gateway 100 is notified from the communication gateway 100 to the management server 200. The management server 200 that has received the notification checks the state of the module. Thus, if some module data that is supposed to be registered in the module managing unit 101 has not been registered, it is possible to promptly find the module of which the module data has not been registered and to have the module data registered in the module managing unit 101. Also, only by having the latest version of the module data registered in the management server 200, it is possible to automatically update an old version of module data with a latest version of module data. In addition, even if the communication gateway 100 is initialized for some reason, it is always possible to restore the communication gateway 100 to the state prior to the initialization.

In the service communication control system S1 according to the first embodiment, to assure quality, the communication carrier needs to strictly manage the service modules stored in the management server 200 so that no unauthorized service module is installed on the communication gateway 100, and that the service modules is not altered illegally. As a method for preventing illegal introduction of service modules, it is effective to perform mutual authentication between the management server 200 and the communication gateway 100 in advance using an electronic certificate or the like before they start communicating with each other, and to encrypt the communication using an encryption protocol such as Secure Socket Layer (SSL) or IPSec.

Further, to prevent the service modules from being tampered with, another arrangement is acceptable in which when a service module is to be notified, a hash operation result for the service module (hash calculation formula is known to only the authorized communication gateway 100 and the authorized management server 200) is appended within the metadata, so that when the communication gateway 100 has received the service module, the communication gateway 100 performs a hash calculation using the hash calculation formula to check if the service module has not been tampered with. With this arrangement, only authorized service modules that are strictly managed in the management server 200 can be installed on the communication gateway. As explained above, the service communication control system S1 is based on an assumption that the management server 200 and the communication gateway 100 are connected to each other within the communication carrier network $N_2$ that is in common between them, and a relationship of mutual trust is established therebetween.

FIG. 11 is a schematic of a service communication control system S2 according to a second embodiment of the present invention. As in the first embodiment, the service communication control system S2 includes the user network $N_1$ and the communication carrier network $N_2$ that are connected to each other via the communication gateway 100.

According to the second embodiment, the user terminal 400 is connected to the user network $N_1$. The user terminal 400 is of basically the same construction and operates in the same manner as the user terminal A 400*a* and the user terminal B 400*b*, and the same explanation will not be repeated. The communication gateway 100, the management server 200, the application server 300, and a portal server 500 are connected to the communication carrier network $N_2$. The application server 300 is of basically the same construction and operates in the same manner as the application server A 300*a* and the application server B 300*b*, and the same explanation will not be repeated.

Although only one application server, i.e., the application server 300, is shown in FIG. 11, there can be a larger number of application servers. Also, although only one user terminal, i.e., the user terminal 400, is shown in FIG. 11, there can be a larger number of user terminals.

The communication gateway 100 includes the module managing unit 101, a module executing unit 102, the user terminal identifying unit 103, the module specifying unit 104, and a device-information collecting unit 105. Because the module managing unit 101, the module executing unit 102, the user terminal identifying unit 103, and the module specifying unit 104 are the same as those in the first embodiment, the explanation thereof will be omitted. Because the module executing unit 102 of the second embodiment is the same as each of the module A executing unit 102*a* and the module B executing unit 102*b*, the explanation thereof will be omitted.

The device-information collecting unit 105 searches for user terminals that are connected to the user network $N_1$. Having discovered a new user terminal in the user network $N_1$, the device-information collecting unit 105 obtains, from the newly-discovered user terminal, device information including a user ID that is identification information of the user using the user terminal, the type of the user terminal, a model name for identifying the model of the user terminal, the manufacturer name, and other information. The device-information collecting unit 105 forwards the obtained device information to a device-information collecting unit 503 of the portal server 500.

The management server 200 includes the module management DB 201, and the module notifying unit 203. The management server 200 according to the second embodiment is different from that of the first embodiment in that the user management DB 202 is not included. Because the module management DB 201 according to the second embodiment is the same as that of the first embodiment, the explanation thereof will be omitted.

According to an instruction from a Graphical User Interface (GUI) controlling unit 504 of the portal server 500, the module notifying unit 203 transmits, to the module managing unit 101 of the communication gateway 100, the user IDs of the user terminals that satisfy a use condition of the application service in correspondence with the executable format of a service module that is required by the application service that is usable by the users.

The portal server 500 includes a device-information management DB 501, a service management DB 502, the device-information collecting unit 503, and the GUI controlling unit 504.

The device-information management DB 501 registers the device information forwarded from the device-information collecting unit 503 in a device-information management table, the device information including the user ID that is identification information of the user using the user terminal, the type of the user terminal, the model name for uniquely identifying the model of the user terminal, the manufacturer name, and other information. Subsequently, in response to a request from the GUI controlling unit 504, the device-information management DB 501 forwards the information of the model name and the like that is in correspondence with the user ID, to the GUI controlling unit 504.

The service management DB 502 registers, in a service management table, a service use condition for each service (necessary device, i.e., necessary user terminal device) and an ID of the service module to be used that is identification information of the service module to be used, in correspondence with service identification information that uniquely identifies the service, the service use condition and the ID of the service modules to be used having been forwarded from the application server 300 via a predetermined communication interface. Subsequently, the service management DB 502 forwards the information including the service identification information, the service use condition, and the ID of the service module to be used to the GUI controlling unit 504.

The device-information collecting unit 503 forwards, to the device-information management DB 501, the device information that has been forwarded from the device-information collecting unit 105 of the communication gateway 100 via a predetermined communication interface, the device information including the user ID, the type of the user terminal, the model name for identifying the model of the user terminal, the manufacturer name, and other information.

Based on the information registered in the device-information management DB 501 and the service management DB 502, the GUI controlling unit 504 creates, for each user, a list of application services that are usable because the user terminal satisfies the service use condition, and controls a GUI to display the list on the user terminal used by the user in such a manner that the user can select a service from the list. When the user has made a selection and specified an application service, the GUI controlling unit 504 identifies a use service module that is required by the specified application service and notifies the module notifying unit 203 of the identified use service module.

FIG. 12 is an example of contents of the service management table stored in the service management DB 502. The service management table has columns for services, service use conditions (necessary devices), and IDs of the service modules to be used.

In the service management table, the "service" indicates information for uniquely identifying an application service provided by any one of the application servers 300 connected to the communication carrier network $N_2$. The "service use condition (necessary device)" indicates information indicating a service user terminal (a user terminal) that is necessary for using the application service. The "ID of service module to be used" indicates information for uniquely identifying a service module that is required in the communication gateway 100 for using the application service.

Each service may require a plurality of devices as the service use condition. Also, each service may require a plurality of service modules to be used.

FIG. 13 is an example of contents of the device-information management table stored in the device-information management DB 501. The device-information management table has columns for user IDs and owned devices. The "user ID" is identification information for identifying a user so that a list of owned devices can be created for each user.

The "owned devices" column further has columns for types, model names, manufacturers, and other information. The "type" indicates information on a product category of the owned device. The "model name" indicates information for uniquely identifying the type of the owned device. The "manufacturer" indicates the name of the manufacturer of the owned device. The "other information" indicates attribute information of the owned device, other than the type, the model name, and the manufacturer.

FIG. 14 is a sequence diagram of a service module notification process performed by the module notifying unit 203 to notify the service module to the module managing unit 101 of the communication gateway 100. First, the application server 300 requests the module management DB 201 of the management server 200 to register an executable format of the service module (step S201).

Having received the data of the executable format of the service module from the application server 300, the module management DB 201 registers the received executable format of the service module in the service module management table stored in the module management DB 201 (step S202).

Next, the application server 300 transmits a request that service information should be registered to the service management DB 502 of the portal server 500 (step S203). Having received the service information registration request from the application server 300, the service management DB 502 registers the service information in the service management table (step S204).

On the other hand, the device-information collecting unit 105 of the communication gateway 100 transmits a Packet INternet Groper (PING) within the user network $N_1$ (step S205), and further transmits a Universal Plug and Play (UPnP), which is a protocol for connecting various types of information terminals with one another via a network and provide one another with functions, within the user network $N_1$ to search for the user terminal 400 (step S206). The UPnP protocol has a specification in which when the user terminal 400 stops operating, other users are notified that the user terminal 400 will be absent by way of an ending message saying "byebye" being transmitted. However, when the electric power of the user terminal 400 is forcibly turned off, the "byebye" message may not be transmitted properly. Thus, a PING is used as well. With this arrangement, it is regularly checked to see if the user terminal 400, which has already been discovered, is present.

Subsequently, the device-information collecting unit 105 notifies the portal server 500 of the information of a newly-discovered user terminal 400 or an already-discovered user terminal 400 that was not confirmed to be alive as a result of the checking process using the PING (step S207). The device-information collecting unit 503 of the portal server 500 that has received the device information registers, for each user, the received device information in the device-information management table stored in the device-information management DB 501 (step S208).

Subsequently, the user terminal 400 requests the GUI controlling unit 504 of the portal server 500 to obtain and transmit a service list (step S209). In response to the request, the GUI controlling unit 504 transmits, in a GUI format, a service list, which is a list of services that are usable on the user terminal 400 (step S210). The user of the user terminal 400 selects a desired service from the service list GUI received from the portal server 500 and transmits a service use contract to be submitted to the GUI controlling unit 504 (step S211).

Upon receiving the submission of the service use contract from the user terminal 400, the GUI controlling unit 504 instructs the module notifying unit 203 to add a service module that is required by the application service (step S212). Having received the service module addition instruction, the module notifying unit 203 refers to the module management DB 201 (step S213), and notifies the module managing unit 101 of an executable format of the service module that is required by the application service (step S214). The module managing unit 101 of the communication gateway 100 that has received the notification of the executable format of the service module installs the service module (step S215).

As explained above, the communication gateway 100 collects the information (e.g., whether the device is alive, the type and the manufacturer of the device) of the device within the user network $N_1$, by using the PING, the UPnP protocol, and the like, and notifies the portal server 500 within the communication carrier network $N_2$ of the collected information. Then, based on the notified device information of the service user, the portal server 500 generates the service list menu including the application services that are usable by using the device, and notifies the service user of the service list menu. Accordingly, when the service module of the service selected by the service user on the portal server 500 is notified to the communication gateway 100 in an on-demand manner, it becomes possible to provide the services that are usable in the network environment of the service user.

As explained above, when the device of the service user is compatible with the UPnP protocol, it is possible to automatically collect detailed device information including the type, the manufacturer, and the model number of the user terminal 400. However, when the device of the service user is not compatible with the UPnP protocol, it is not possible to collect the information of the user terminal 400. To deal with the user terminal 400, the portal server 500 can include a user interface for manually registering device information. In such a situation also, the device information is managed by the device-information management DB 501 for each user. With this arrangement, it becomes possible to utilize not only the device information of the devices that are compatible with the UPnP, but also the device information of various types of the user terminals 400.

When a service user has made access to the portal server 500 by using a browser such as a personal computer or a television receiver, the portal server 500 refers to the information in the device-information management DB 501 and the service management DB 502, generates a service menu that includes a list of services that are usable in the environment of the user, and notifies the list to the service user, as a response. When the service user has selected a service that he/she wishes to use from the notified service menu, the portal server 500 refers to the service management DB 502, identifies the service module that is necessary for providing the service selected by the service user, and gives a module addition instruction (notifies the module ID and a communication gateway identifier) to the management server 200 so that the identified service module is added to the communication gateway 100. The management server 200 refers to the module management DB 201, obtains the service module indicated in the instruction from the portal server 500, and notifies the communication gateway 100 of the module data.

According to the second embodiment, it is possible to promptly provide the service that is suitable to the environment of the service user by providing the service menu that corresponds to the environment information of the service user and adding the service module that corresponds to the service to the communication gateway 100 in an on-demand manner.

As explained above, upon receiving the submission of the service use contract from the user terminal 400, the GUI controlling unit 504 instructs the module notifying unit 203 to add the service module that is required by the application service. Having received the service module addition instruction, the module notifying unit 203 refers to the module management DB 201, and notifies the module managing unit 101 of the executable format of the service module that is required by the application service. Thus, it is possible to dynamically switch between service modules to add the service module that is necessary in the communication of the application service, depending on the desired application service selected by the user.

The service module management process shown in FIG. 7, the service use process shown in FIG. 8, the user authentication process shown in FIGS. 9A and 9B, the module update checking process shown in FIG. 10 according to the first embodiment are all performed in the same manner in the second embodiment. Thus, the explanation thereof will be omitted.

The respective processes explained in the embodiments can be entirely or partially realized by executing a computer program on a computer system such as a personal computer, a server, or a work station.

Of the respective processes explained in the embodiments, all or a part of the processes explained as being performed automatically can be performed manually, or all or a part of the processes explained as being performed manually can be performed automatically in a known method.

The process procedures, control procedures, specific names, and information including various types of data and parameters mentioned in the above description and the drawings can be arbitrarily changed unless otherwise specified.

The respective constituents of the illustrated apparatus are functionally conceptual, and need not necessarily be physically configured as illustrated. In other words, the specific mode of arrangement of the apparatus is not limited to that shown in the drawings, and can be functionally or physically separated or integrated, partly or wholly, according to the load or usage.

The same function of the apparatus can be entirely or partially realized by CPU or a computer program executed by CPU. The apparatus can also be implemented in wired-logic hardware.

As set forth hereinabove, according to the embodiments of the present invention, the communication including requesting, in response to a request from the service user terminal, the service providing device to provide the service and relaying the service from the service providing device to the service user terminal is performed using the predetermined protocol corresponding to the service. The communication that requires the predetermined protocol is relayed by the service relaying apparatus in an integrated manner. Consequently, it is possible for the service user terminal to communicate with the service providing terminal without being concerned about the protocol. In addition, the communication related to the use of the application service is managed by the relay server apparatus in an integrated manner. Thus, it is possible to improve the security of the communication related to the application service.

Moreover, the service providing device is requested to provide the service only to an authorized service user terminal. Thus, regarding the traffic from the service user terminals to the service providing device, only authorized service user terminals permitted to use the service can access the service providing device. Consequently, it is possible to prevent unauthorized access to the service providing device.

Furthermore, the service user terminal specifies the service providing device to which the provision of the service is to be requested, and selects the communication control program necessary to communicate with the service providing device. Thus, only authorized service user terminals can receive the service from the service providing device. Consequently, it is possible to improve the security in providing the service.

Moreover, only when the service user terminal is identified as an authorized service user terminal based on the terminal identification information, the service providing device is requested to provide the service so that only the authorized service user terminal is permitted to access the service providing device and receive the service. Thus, unauthorized service user terminals are prevented from accessing the service providing device and receiving the service. Consequently, it is possible to improve the security of the communication related to the application service.

Furthermore, the service relaying apparatus that has received the communication control program with the attribute information can manage, in an integrated manner, various types of service modules based on the attribute information. The management server manages the communication control program to be reported to the service relaying apparatus. Thus, the communication control program necessary for the service used by the service user who subscribes to the service becomes clear, so that it is possible to reliably notify the service relaying apparatus of the necessary communication control program. In addition, because the management server manages the communication control program provided by the service providing device, it becomes easy to manage coincidence of the communication control program.

Moreover, the list of services available for each service user is created based on the collected terminal-attribute information of service user terminals, the conditions required to use service and the identification information of the communication control program. Then, the list is displayed in such a manner that the service user can select a service from the list on the service user terminal. Consequently, the service user can easily select an available service. Additionally, upon receiving an instruction to add/delete the communication control program that is necessary for providing the service, the management server reads and notifies the service relaying apparatus of the communication control program or deletes the communication control program from communication control programs managed by the service relaying apparatus. This operation can be performed without making the service user concerned about the addition/deletion of the communication control program.

Furthermore, the communication control program is dynamically selected in response to the selection of the service by the service user. Thus, the service user can use the application service without being concerned about selecting the communication control program. Also, when there is a difference between the control information of the communication control program managed by the management server and that of the communication control program received from the service relaying apparatus, the communication control program managed by the service relaying apparatus is updated with the communication control program managed by the management server. Thus, as long as the communication control program managed by the management server is proper and the latest one, it is possible for the service relaying apparatus to always manage the proper and latest communication control program.

Thus, use of new application service can be easily started, and unauthorized access from a service user terminal can be prevented to enhance the quality of communication for the application service.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A service communication control method for providing an application service from a service providing device to a service-user terminal via a service relaying apparatus, wherein a management server is located between the service providing device and the service relaying apparatus, and a portal server is located between the service providing device and the service relaying apparatus, the service communication control method comprising:

the management server managing communication control programs provided by service providing devices;

the management server managing users who subscribe to services provided by the service providing devices together with program identification information of the communication control programs necessary for the services;

the management server reading the communication control program based on the program identification information, and notifying the service relaying apparatus of the communication control program;

the portal server managing terminal-attribute information of service-user terminals collected by the service relaying apparatus with respect to each of the users;

the portal server managing service information including the program identification information and use condition required to use the service notified by the service providing device;

the portal server creating a list of services available for the respective users on the service-user terminals based on the terminal-attribute information and the service information, and displaying the list to allow each user to select a service from the list on the service-user terminal;

the service relaying apparatus requesting the service providing device to provide a service in response to a request from the service-user terminal; and the service relaying apparatus relaying communication between the service providing device and the service-user terminal with a protocol corresponding to the service to provide the service to the service-user terminal, wherein the service relaying apparatus requesting includes requesting the service providing device to provide the service when the service-user terminal is an authorized service-user terminal, and the service relaying apparatus includes identifying whether the service-user terminal is an authorized service-user terminal, relaying the communication by one of a plurality of communication control programs that use different protocols for respective service providing devices, specifying the service providing device that has been requested to provide the service to the service-user terminal identified as an authorized service-user terminal; and selecting a communication control program from the communication control programs that is necessary for the communication with the service providing device.

2. The service communication control method according to claim 1, wherein the selecting includes selecting the communication control program corresponding to the service-user terminal that has been identified based on terminal identification information.

3. The service communication control method according to claim 1, wherein the service relaying apparatus relaying further includes authenticating a user of the service-user terminal to determine whether the user is an authorized user, and the selecting includes selecting the communication control program corresponding to the service-user terminal used by the user who has been authenticated.

4. The service communication control method according to claim 1, further comprising the service relaying apparatus managing, in an integrated manner, the communication control programs provided by the service providing devices based on attribute information of the communication control programs.

5. The service communication control method according to claim 1, wherein the portal server creating includes issuing an add instruction and a delete instruction to the management server to add and delete a communication control program necessary to provide a service selected from the list.

6. The service communication control method according to claim 1, wherein the selecting includes dynamically selecting the communication control program in response to selection of the service from the list by each user on the service-user terminal.

7. The service communication control method according to claim 1, further comprising:

the management server managing the communication control programs provided by the service providing device;

the management server reading a communication control program from among managed communication control programs and notifying the service relaying apparatus of the communication control program based on the add instruction; and the management server deleting a communication control program provided to and managed by the service relaying apparatus based on the delete instruction.

8. The service communication control method according to claim 1, further comprising:

the service relaying apparatus regularly notifying the management server of program attribute information of the communication control program managed by the service relaying apparatus; and the management server updating the communication control program managed by the service relaying apparatus with the communication control program managed by the management server, upon receiving the program attribute information, when there is a difference between control information of the communication control program managed by the management server and control information of the communication control program received from the service relaying apparatus.

9. A service relaying apparatus, wherein a management service is located between the service providing device and the service relaying apparatus, and a portal server is located between the service providing device and the service relaying apparatus, comprising:

a processor; and a memory storing computer-readable instructions, execution of the instructions by the processor facilitating relaying a service provided from a service providing device to a service-user terminal, execution of the instructions by the processor configuring the service relaying apparatus to include:

a service relaying unit that requests the service providing device to provide a service in response to a request from the service-user terminal, and relays communication between the service providing device and the service-user terminal with a protocol corresponding to the service to provide the service to the service-user terminal, a management server managing unit that manages communication control programs provided by service providing devices, and manages users who subscribe to services provided by the service providing devices together with program identification information of the communication control programs necessary for the services, a management server reading unit that reads the communication control program based on the program identification information, and notifying the service relaying apparatus of the communication control program, a portal server managing unit that manages terminal-attribute information of service-user terminals collected by the service relaying apparatus with respect to each of the users, and manages service information including the program identification information and use condition required to use the service notified by the service providing device, a portal server creating unit that creates a list of services available for the respective users on the service-user terminals based on the terminal-attribute information and the service information, and displaying the list to allow each user to select a service from the list on the service-user terminal, wherein the service relaying unit includes a service-user terminal identifying unit that identifies whether the service-user terminal is an authorized service-user terminal, and, when the service user terminal is an authorized service-user terminal, requests the service providing device to provide the service, the service relaying unit further including a program selecting unit that relays the communication by one of a plurality of communication control programs that use different protocols for respective service providing devices, specifies the service providing device that has been requested to provide the service to the service-user terminal identified as an authorized service-user terminal, and selects a communication control program from the communication control programs that is necessary for the communication with the service providing device.

10. The service relaying apparatus according to claim 9, wherein the program selecting unit selects the communication control program corresponding to the service-user terminal that has been identified based on terminal identification information.

11. The service relaying apparatus according to claim 9, wherein the service relaying unit further includes a user authenticating unit that authenticates a user of the service-user terminal to determine whether the user is an authorized user, and, selects the communication control program corresponding to the service-user terminal used by the user who has been authenticated.

12. The service relaying apparatus according to claim 9, wherein the program selecting unit dynamically selects the communication control program in response to selection of a service from a list of available services displayed on the service-user terminal.

13. The service relaying apparatus according to claim 9, further comprising a program managing unit that manages, in an integrated manner, the communication control programs provided by the service providing devices based on attribute information of the communication control programs.

14. A service communication control system comprising:
a service relaying apparatus; and
a service providing device that provides an application service to a service-user terminal via the service relaying apparatus, wherein
the service relaying apparatus includes a service relaying unit that requests the service providing device to provide a service in response to an authorized request from the service-user terminal, and relays communication between the service providing device and the service-user terminal with a protocol corresponding to the service to provide the service to the service-user terminal,
the service relaying unit includes a service-user terminal identifying unit that identifies whether the service-user terminal is an authorized service-user terminal, and when the service-user terminal is an authorized service-user terminal, requests the service providing device to provide the device,
program selecting unit that relays the communication by one of a plurality of communication control programs that use different protocols for respective service providing devices, specifies the service providing device that has been requested to provide the service to the service-user terminal identified as an authorized service-user terminal, and selects a communication control program from the communication control programs that is necessary for the communication with the service providing device,
a management server that is located between the service providing device and the service relaying apparatus, and includes
a program managing unit that manages a communication control program provided by the service providing device,
a user managing unit that manages a user who subscribes to service provided by the service providing devices together with program identification information of the communication control program necessary for the service;
a program notifying unit that reads the communication control program based on the program identification information, and notifies the service relaying apparatus of the communication control program
the service communication control system further comprising a portal server that is located between the service providing device and the service relaying apparatus, and includes
an attribute-information managing unit that receives terminal-attribute information of service-user terminals collected by the service relaying apparatus and manages the terminal-attribute information for respective users;
a service managing unit that manages service information including identification information of the communication control program and use condition required to use the service notified by the service providing device; and
a service list control unit that creates a list of services available for the respective users on the service-user terminals based on the terminal-attribute information and the service information, and displays the list to allow each user to select a service from the list on the service-user terminal.

* * * * *